United States Patent [19]

Studievic et al.

[11] 4,249,826

[45] Feb. 10, 1981

[54] METHOD AND DEVICE FOR ANALYZING AND MEASURING OUT CONSTITUENTS OF SOLID OR LIQUID MEDIA

[75] Inventors: Claude Studievic, Paris; Guy Brossard, Osny; Philippe Yribarren, Saint Jean De Luz, all of France

[73] Assignee: Laboratoires Biotrol S.A., Paris, France

[21] Appl. No.: 925,981

[22] Filed: Jul. 19, 1978

[30] Foreign Application Priority Data

Jul. 25, 1977 [FR] France ............................... 77 22796

[51] Int. Cl.[3] ............................................ G01N 21/01

[52] U.S. Cl. .................................... 356/244; 250/576; 356/246

[58] Field of Search .................. 356/244, 246; 422/68; 250/432 R, 428, 227, 573, 576

[56] References Cited

U.S. PATENT DOCUMENTS

| | | | |
|---|---|---|---|
| 2,942,520 | 6/1960 | Rose | 356/244 X |
| 3,031,924 | 5/1962 | Lamal | 356/244 X |
| 3,068,739 | 12/1962 | Hicks, Jr. et al. | 250/227 X |
| 3,164,663 | 1/1965 | Gale | 250/227 X |
| 3,759,374 | 9/1973 | Helger et al. | 356/246 X |
| 3,998,594 | 12/1976 | Horne | 422/68 |
| 4,038,030 | 7/1977 | Albright et al. | 422/61 X |
| 4,058,367 | 11/1977 | Gilford | 422/67 X |
| 4,116,775 | 9/1978 | Charles et al. | 356/246 X |

FOREIGN PATENT DOCUMENTS

| | | | |
|---|---|---|---|
| 2307258 | 5/1976 | France | 356/246 |

*Primary Examiner*—Paul A. Sacher
*Assistant Examiner*—Bruce Y. Arnold

[57] ABSTRACT

A device useful for the analysis and measurement of the constituents of solid or liquid media consists of a hermetically closed container containing chemical or biological reactants necessary for the analysis, in liquid, lyophilized or solid form. The container constitutes a hollow space formed in a perforatable material inert with respect to the participants in the reaction. It includes a non-removable rigid cover which is advantageously optically flat at least on its inner surface and optically transparent over at least its central portion. The device and method are applicable to any measurements and analyses, whether manual or automatic, of the constituents of liquid or solid media, notably test samples of biological media.

25 Claims, 4 Drawing Figures

METHOD AND DEVICE FOR ANALYZING AND MEASURING OUT CONSTITUENTS OF SOLID OR LIQUID MEDIA

BACKGROUND OF THE INVENTION

1. Field of the Invention

The present invention relates to the analysis and measuring out of the constituents of solid or liquid media, notably constituents of biological media.

In present day practice, analyses and measuring out is carried out by manipulating equipment, sampling devices and reactants, which are mostly exposed to the ambient atmosphere.

Automatized devices aimed at reducing the number of manual operations to be effected for each measurement are also known.

2. Description of the Prior Art

Thus, in particular, the ACA system marketed under this name by the du Pont Company, Instrument Products Division, Wilmington, Delaware, USA, comprises a container of plastics material, containing test reactants and which has to serve as a measuring cup; however this container must be introduced, behind the separate container containing the specimen to be tested, in a very complex installation, necessary in order that strict operational conditions may be respected, enabling the production of reliable results. This system operates by photometry and necessitates the placing in position of an accurate optical cell outside the reaction container, including the effects of the two transparent walls of the latter, resulting in a complex system and in certain limitations in the variety of the possible tests.

Another system, marketed under the name Clinicard by Instrumentation Laboratory (represented by R. Delhomme and Cie, 30 boulevard Saint-Jacques, Paris), comprises a pocket enclosing a cup for single use with three compartments, formed entirely of molded plastics material transparent to the ultraviolet. In such a device, the parts which must enable the measurement have to be masked until the last moment to avoid subjecting them to finger marks or to scratches, since it is necessary, prior to any measurement, to take the three compartment cup and to introduce into one of the compartments the pre-established amount of reactants. In addition, the latter can only be in solid form. Besides, the filling of the measuring cup by means of the solid reactant, a diluant (obligatory) and the specimen, in their three respective compartments, necessitate the piercing of the diaphragms closing the orifices formed on the upper surface of said cup, and this by means of a triple perforator. The orifices thus opened must then be replugged. This system is not capable of automatization.

An apparatus is also known for unit analyses on micro-amounts, marketed under the name STAC by Technicon, comprising an analytical cell constituted by two tanks and containing reactants in lyophilized form. The method of putting these cells into operation is very sophisticated and the preservation of the lyophilized reactants requires a minimum of precautions. In addition, this presentation of the reactants necessitates their dilution before any measurement, which can be a considerable drawback where the need to carry out an analysis with an utmost urgency is involved.

Whatever the devices or apparatuses available today, consequently, it has not been possible to carry out analyses and measurements simply and practically, without applying sophisticated equipment, and especially without having need for operating with extreme care and following strict operational techniques.

GENERAL DESCRIPTION OF THE INVENTION

Original and simple means have now unexpectedly been found for effecting, both manually and automatically, analyses and measurements of constituents of media both liquid and solid, notably of constituents of test samples of biological media.

According to the invention there is provided a device useful for the analysis and measuring out of constituents of solid or liquid media, consisting essentially of a hermetically closed container containing chemical or biological reactants necessary for the analysis, in liquid, lyophilized or solid form, said container constituting any hollow space formed of a perforatable material, inert with respect to the participants in the reaction and including a cover irremovable, rigid, and advantageously optically flat at least on its inner surface and optically transparent on at least its central portion.

The invention also relates to a process for the carrying out of analyses and measuring of constituents of solid or liquid media, comprising the introduction by piercing in a perforatable part of a device according to the definition given above, previously turned over, of means respectively (A) for the introduction of diluents and/or of test samples of the medium to be measured and (B) for the measurement, as well as if necessary the optimization, of the reaction enabling the measurements in situ.

These means according to the invention enable the carrying out, in an original and particularly simple and positive manner, of the analysis, both qualitative and quantitative, and both manual and semi-automatic or automatic, of various constituents present in solid or liquid media, notably in samples of biological liquids.

The case of biological liquids is intended to constitute one of the most frequent applications of the invention and the most usual one.

BRIEF DESCRIPTION OF THE DRAWINGS

In the remainder of the present description, the device and the process according to the invention are described in more detail with reference to the accompanying sheets of drawings given purely by way of illustration, and not to be regarded as limiting, in which.

DESCRIPTION OF THE PREFERRED EMBODIMENT

Figure 2:
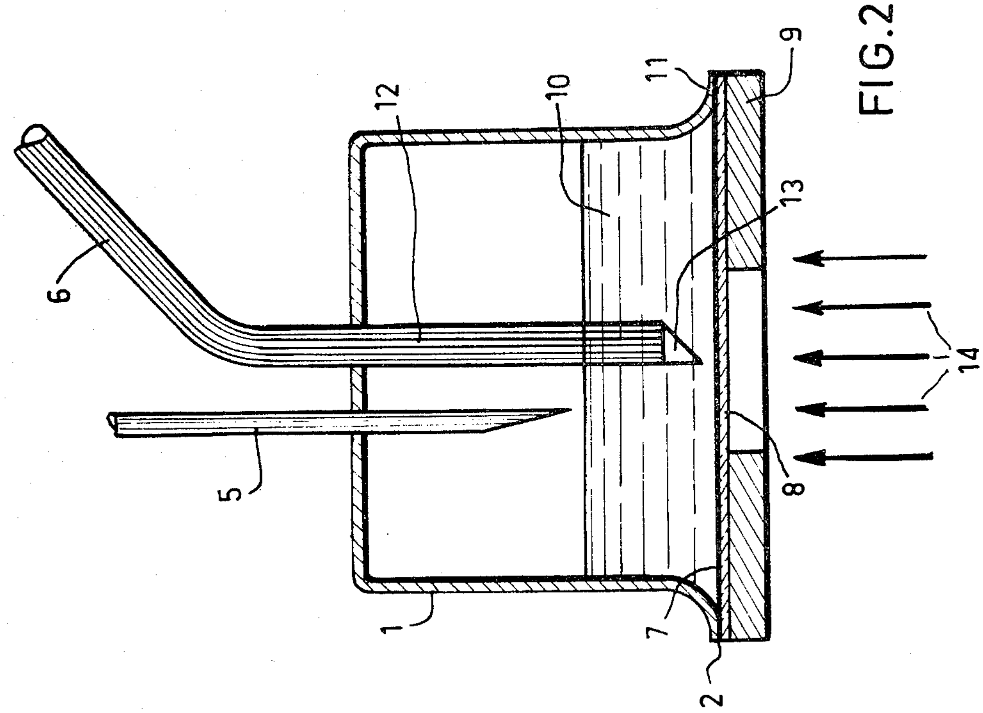
FIG. 2 is a cross-sectional view of an embodiment of a device according to the invention, turned over in analysis position for photometric reading.
Figure 1:
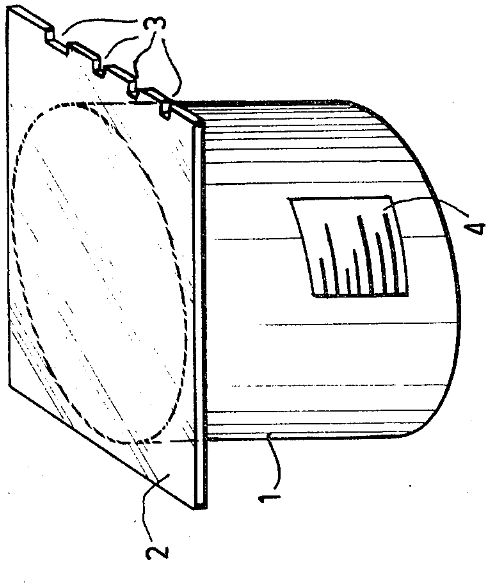
FIG. 1 shows in mounted perspective an embodiment of a container according to the invention, with its system of coded data.

At the moment of its use, the container 1 previously turned over so as to rest on its cover 2 receives, as indicated above, a test sample 5 of the specimen containing the one or more substances to be measured or detected (FIGS. 1 and 2).

For the measurement or the detection proper, there is introduced afterwards, or simultaneously with, the piercing of the perforatable walls of said container, at least one suitable sensor 6, which is immersed in the liquid medium; it will at once be seen that it is convenient in practice, in the case of proportioning the constituents of a solid medium introduced in powdered or granular form, to dilute this solid medium by means of suitable diluents. In particular cases however, this could be the reactant itself, even though it may be in liquid form, which carries out this dilution in the midst of the container.

The means according to the invention enable measurements either singly, or in series; they have the principal advantages of presenting the necessary reactants in a form so that they are ready for use and of ensuring the preservation thereof under optimal conditions, as well as enabling analyses and measurements carried out by use of these reactants to be operated by simple connection with suitable appended devices which are more or less sophisticated.

The container provided with the cover above-mentioned and containing the necessary reactants constitutes a single chamber.

The latter is of very simple manufacture and may be constructed of inexpensive materials and by inexpensive methods.

The specialist has himself to determine, among the large number of newly available materials and those already placed on the market or, even those older materials which are still in use today, the materials which it is possible to apply in each case arising, to construct on request a device according to the invention and responding to precise specifications, at the same time as being advantageous in costs.

Thus the body 1, with the exception of the cover 2, of the container according to the invention can be constructed of any semi-rigid plastics material, by molding, by extrusion, by heat-forming a sheet or by any other suitable method. This semi-rigid plastics material may be, for example, constituted by ABS (acrylonitrile-butadiene-styrene), cellulose acetate, crystalline propylene and ethylene copolymer, PVC copolymer, ethylene ionomers, low density polyethylene, thermoformable or expanded polystyrene or the like.

The semi-rigid material of the body of the container can also have a cardboard base, alone or paraffined, or preferably associated with plastics or metallic constituents designed to confer on it, if necessary, chemical inertness and increased impermeability.

It is also possible to contemplate the use to this end of other complex materials, such as for example an aluminum/polypropylene complex, provided only that the latter satisfy also the required conditions of behavior on aging and absence of hydrophilic properties.

Whatever the material used, the latter must preferably be opaque and protect the contents of the closed container from humidity.

This container must constitute a hollow space of any shape, preferably cylindrical or again substantially parallelepipedic, and it is closed by an irremovable cover. The cover 2 must be irremovable, rigid, optically flat at least on its internal surface 7 and optically transparent over at least its central portion 8.

The cover is positioned on top of the container into which there has been previously introduced and measured the one or more reactants that it should contain, either by gluing, or by welding, notably by ultrasound, or by any other suitable conventional means.

In practice, it is possible to select for the material constituting this cover, a rigid transparent plastics material and among others a transparent plastics material of plates made in known manner by means of polyethylene, polystyrene, PVC, polyester, polycarbonate, a polyacrylic resin such as a polymethylmethacrylate, polyethylene glycol terephtalate, melamineformol aminoplast, or any possible mixture thereof, polystyrene or polymethylmethacrylate being especially preferred.

In the present context, by "transparent material" is meant a material which is transparent or at least translucent with respect to the visible light and the near ultraviolet to at least about 340 nm and beyond if possible.

This condition is necessary in the case of photometric measurements only.

In each particular case, it is possible to determine by simple tests if the material contemplated responds or not to the desired specifications. It is known that, according to the transparency qualities of a sheet or of a plate, a part of a light beam which passes through it is diffused over a greater or lesser angle with respect to the direction of the incident beam which causes a clouding of the images collected or examined through this sheet or plate.

Reference may be made in this respect to French standard AFNOR NF T 54-111 of April 1971 (Transparent sheets of polyethylene-Determination of cloudiness for evaluating diffused and transmitted light). According to this standard, there are successively evaluated by means of a photoelectric cell, using a light integrating sphere, the light flux transmitted through a specimen of sheet and the flux diffused beyond a conventionally fixed angle. The value of the cloudiness is expressed by the ratio in percent of the values of these two fluxes.

It must be noted that containers according to the invention can be manufactured in units, separately; but a preferred mode of manufacture consists of preparation of a series of such devices in a strip or in the form of "blisters" in one or several rows. It is possible to carry out such manufacture by an entirely automatic process, which offers the advantage of permitting the production on a single machine of the three successive operations of forming, filling thereof and fixing of the covers, from two plates or strips of raw material, namely by means of a semi-automatic apparatus using strips or rolls of open thermo-formed containers to be filled and including a separate cover-applying operation.

It is possible to provide for equiping the cover itself with a protective member 9, added and fixed on the outer face of said cover by any suitable means. This protective member may be removable or fastened to stay; in the latter case it must, however, leave one part clear, preferably the central part, of the cover and in practice this is achieved simply by giving the protective member the shape of a circular ring.

Such a protective member, if the device according to the invention is provided therewith, can have the advantage of serving also as a base for the device when the latter is turned over and it is positioned for its utilization. The optically transparent cover remains, in this case, isolated from any contact which could alter its optical properties.

The cover is applied irremovably to the body of the device according to the invention, after the introduction into the latter of the necessary reactants 10, by any conventional means suited to the materials present, such as gluing, welding with ultrasound, etc. As a general rule, the positioning and fastening of the cover are facilitated if the body of the container comprises a flat rim 11 on which the cover becomes supported.

The cover may in addition be fashioned, on its periphery, so that it comprises cut-outs or notches 3 aimed at permitting, if desired, transfer of the containers with mechanical means to be ensured, and/or transmission to a suitable sensor of data adapted to put into operation mechanical, electronic or other devices, necessary for the sound operation of semi-automatized or automatized analyses.

Instead of that, or in addition, the outer walls other than the cover of the container can bear information readable by the operator or by electronic or mechanical devices. These indications can notably include data regarding the type of measurement, the manipulations to be ensured and generally any information useful for the efficient execution of the analysis and/or the identification of the specimen. It may also relate to inscriptions borne in alpha-numeric form, but also (and preferably) coded data 4 in the form of bars for machine reading and decoding; the latter system is becoming more and more widespread today and is already well-known by the technician skilled in the art, essentially under the Anglo-Saxon name of "Bar Coded Labels".

The container according to the invention contains reactants necessary for the measurement, in a suitable form, as has been indicated above. These reactants must be introduced before the hermetic positioning of the optically transparent cover. They may be liquid or lyophilized, or in solid form, that is to say, for example in the form of crystals, inert powders, mixtures of powders and crystals, tablets, etc.

The cover constitutes a rigid part, whilst the lateral walls and the bottom of the container are semi-rigid and perforatable and in practice of slight thickness.

For use according to the invention, this container is first turned over, that is to say stood on its cover or on the protective member for the latter, if this protective member is kept in place and only occupies a part of the surface of the cover.

Any one of the perforatable walls is then pierced through, preferably the bottom, by suitable devices 5, so as to ensure the passage and introduction into the container of:

syringes enabling the introduction of possible diluents and/or sampling of the products to be measured, various sensors, notably necessary for the determination of temperature, pH, or of the reaction generated (in which cases it is possible to resort to optical, chemical, electronic, electro-optical, colorimetric sensors, their combinations or associations, simultaneous or not, or the like), devices combining the contribution of the reactants or of the reactant complements in suitable form and specific sensors such as, for example, electrodes including enzymes immobilized on inert supports, or generally any device necessary for the execution and measurement of the reaction in situ.

In the case where the reactants are present in solid form in the container, the procedure is started, after turning over said container, by placing them in solution by introducing at least one suitable liquid through one of the perforatable walls, by means of syringes or generally by means of a dispensing device. It is possible to accelerate this dissolution by introducing preheated diluents, or by positioning the container within the field of ultrasonic radiation. The sample of the specimen to be tested can then be similarly introduced by means of a dispensing device, which can be the device 5 itself.

When the reactants are already present in liquid form in the container or have been, prior to the introduction of the specimen, placed in solution as already described above, the reaction starts immediately.

The reactants suitable for making analyses can be, according to convenience, selected without any difficulty by the technician among any reactants or mixtures of known reactants, useful for the analysis and/or the measurement of the constituents of the solid or liquid media, notably of the constituents of biological media.

In particular cases, which the technician will determine himself, it is possible to introduce simultaneously into the container which constitutes the measuring cell, the specimen and the diluent, the specimen being previously diluted or not.

Alternatively, the introduction of the specimen may be preceded by a suitable treatment, for example, for carrying out deproteinization (in the case of biological specimens) or filtration, when the good execution of the subsequent analysis requires it. This may be done by means of conventional appended devices.

The application in the container of sensors 6 for the measurements and the quantification of the reactions generated in situ is done by methods similar to those to which recourse is had for the introduction of the diluents or of the possible additional reactants, or of the specimen. One of the perforatable walls is pierced, preferably the bottom of the container, and the sensor is inserted until it dips suitably into contact with the liquid medium,, and preferably within the latter.

To simplify the description, and to illustrate in a more concrete, but non-limiting manner, the device and the method according to the invention, an embodiment is described diagrammatically below in the case of measurement by photometry, with reference to FIG. 2.

A cylindrical container 1 of injection-molded polystyrene is used, containing in liquid form the suitable reactants 10 for the measurement of which they are applied, and provided with a rigid cover 2, of polymethylmethacrylate, optically transparent and flat at least on its inner surface 7–8, hermetically welded to the rest of the container which includes a rim 11 for this purpose. The cover is itself provided with a non-removable protective ring 9, on its outer surface. This container is turned over and it is positioned above a suitable light source 14.

After having pierced the bottom of this inverted and positioned container, there is introduced and dipped, until it is immersed in the liquid whose absorption has to be measured, an optical fiber 12 whose useful end includes an optically flat tablet, constituted by a sapphire or synthetic ruby 13, for example.

The end of this optical fiber is strictly positioned, advantageously by using a suitable external mechanical device, so as to arrange for a strictly fixed, predetermined thickness of liquid (constant in the course of a series of successive measurements) between the inner surface 7 of the optically transparent cover and the operative end of the optical fiber immersed in the liquid medium.

It is also possible to introduce the sample, or specimen, either before or after this positioning of the measuring means. Preference is however for the subsequent introduction of the specimen, since it enables a prior blank measurement to be made, if desired. This is an additional advantage of the present invention with respect to methods ordinarily applied hitherto.

Figure 3:
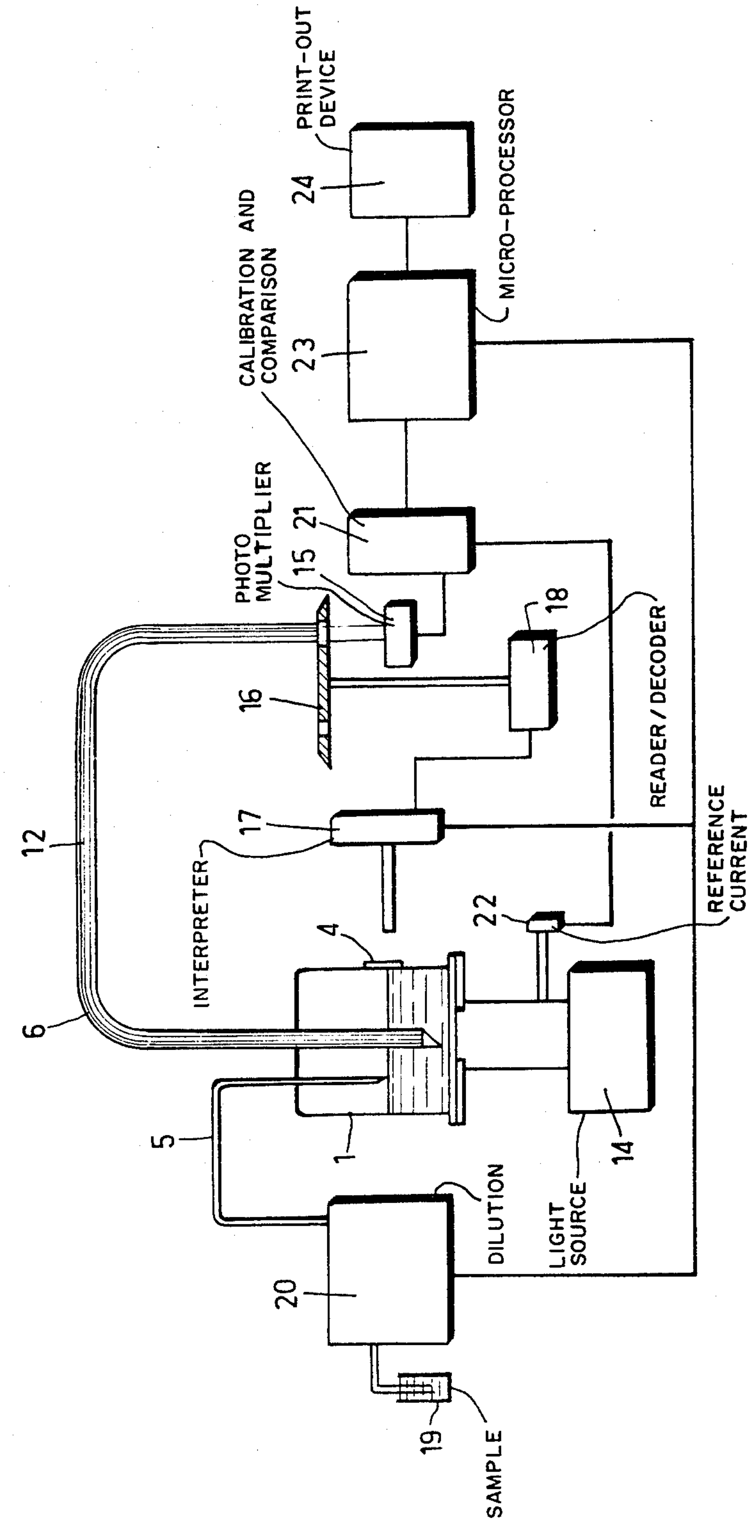
FIG. 3 is a block diagram giving the main lines of the operation of the process according to the invention, in its automatized version.
Figure 4:
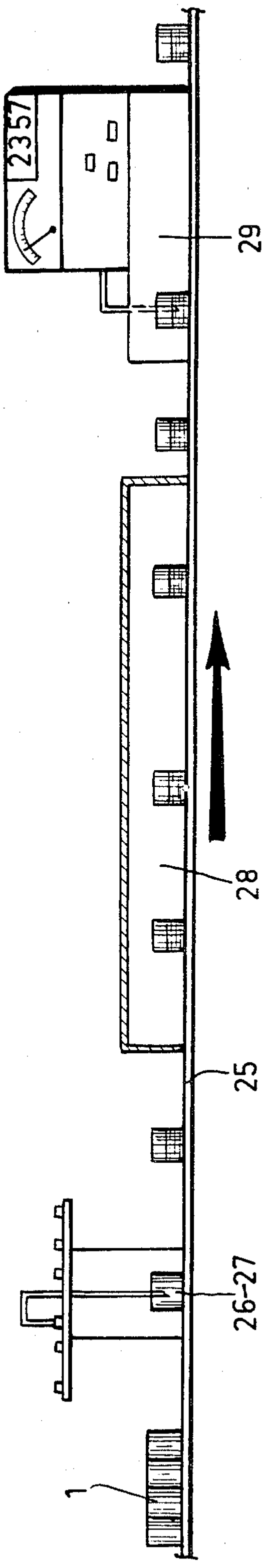
FIG. 4 is an operational diagram of an automatized sequence comprising the placing in operation of the device and of the process according to the invention.

In the specific case presently described in FIG. 3, the transmitted light is conducted by the optical fiber 12 to a conventional photomultiplier device 15, after having cleared a wave length selector system 16, placed in position manually or mechanically, and which corresponds to the measurement to be carried out. According to a preferred embodiment, this wave length selection can be done automatically if apparatuses 17–18 are stopped for the readout, for the decoding and the interpretation of the coded data 4 which should carefully be shown on the cover or any one of the walls of the device according to the invention (see above).

However, the measurement of photometric type is of course not the only possible case.

Still, in using the same device and turning it over and, if necessary, positioning it as has just been indicated, it is possible, just as the end of an optical fiber could be brought into the reaction medium to be measured, to introduce into this same medium other physico-chemical sensors, to enable also the measurement or to evaluate a physico-chemical parameter necessary for the sound conclusion of the principal measurement, such as, for example and without being limiting, temperature or pH.

The sensors which can thus be employed are, among others, thermometric probes, ion electrodes, gas electrodes, electrodes combined with enzymes insolubilized on a membrane, etc.

It is possible in the same way to provide, instead and in place of the ordinary light source, for the utilization of a laser generator and an appended apparatus, enabling, for example, measurement of the turbidity of a medium wherein a reaction of the antigen-antibody type is generated.

In general, the present invention enables the utilization of any physico-chemical sensor, provided that the dimensions of the latter are compatible with those of the container utilized. In the cases where it is desired, it is possible even to introduce simultaneously into the same container several of these sensors, identical or different.

As has already been explained above, the container according to the invention may be used as shown as least partially in FIG. 3, in conjunction with appended devices, among which it may be enumerated:

devices for the dissolving of the reactants, if the latter are present in the container in solid or concentrated form (for example syringes, or liquid dispensing mechanisms, advantageously adapted to pierce themselves the perforatable walls of the container), appended solvating devices (operating by vibration, shaking, or using ultrasound or by heating), devices 5 for the injection of the sample 19, after a possible dilution step 20, incubation devices, designed to facilitate the development of the reaction, if necessary, devices constituted essentially by physico-chemical or physical sensors 6, associated with the container and suitably positioned with the latter with respect to a luminous light source 14, of normal or laser type, devices for the conversion of data transmitted by the sensors. These are in practice, photomultipliers 15, electrical current amplifiers, elements 21 for the calibration and comparison to reference currents 22. In an automatized or semi-automatized system, provision is also made for the transmission of these data to analogical or numerical measuring devices. It is also possible to store them in a memory, to compare them and if necessary to process them by a microprocessor 23, and to transcribe them or to display them or cause them to appear through a print-out device 24, if necessary. As a modification, it is possible to route certain data directly to the microprocessor (for example the data regarding the sampling of the specimen, the wave length of the filter to be used, the number of the specimen treated, etc.) and to obtain in return suitable adjustment of the measuring apparatus or the expression of values previously stored in the memory (after a prior standarizing and/or calibration operation).

In the automatic version of the method according to the invention, (for example for repetitive operation in medical analysis laboratories) which enables numerous specimens to be presented for analytical purposes and to carry out these analyses in series, it is possible to use a conveyor mechanism 25 which presents the one or more containers 1 at each of the stations, such as those operating the functions of:

measurements/introduction of diluents 26, measurements/introduction of sample 27, incubation 28, quantification of the reaction 29.

It is possible to carry out the necessary adjustments at each of these stations, that is to say in practice, the selection of the volumes, of the incubation temperatures if necessary and of the measuring characteristics, such as the wave length and standardization, either by human intervention, or by machine, from coded data borne by the container constituting the measuring cell, processed by a logic processor and utilized at the moment, and on the model which will have been previously selected.

It is seen that thus it is possible to succeed with random sequences of containers which constitute measuring cells corresponding to varied measurements.

With respect to the systems, almost all very sophisticated, which are at present commercialized for the carrying out of unit and repeated analyses, the device and its various possible methods of application according to the invention are distinguished by their extreme simplicity, as will emerge from the foregoing description. It is possible in fact, according to the invention to carry out measurements, both unitary and in series, by manual, semi-automatic or automatic procedure, according to the needs and equipment available. It is clear that this provides for a flexibility of use which is not possessed by related devices of the prior art.

Due to the fact itself of its design, which renders it particularly reliable in all circumstances, since it enables stabilization, preservation and simple and sure transportation of the analytical reactants, the device according to the invention can have very diverse applications, notably and preferably in the domain of analysis by the wet route. Among the latter, may be mentioned the following applications:

in biological domains (case of biological analysis laboratories, and units where work is carried out relating to biochemistry, immunology or microbiology), in biochemical domains, notably in the biological industry, for production checks in chemical, pharmaceutical and food industries, for pollution measurements, notably water pollution measurements.

However other applications are also possible; in a general manner, it may be applied to all types of analyses which have to be carried out either singly or by means of simple manually controlled systems, or by multiple series, for which systems with automatic control and adjustments are applied.

If one respects the minimum conditions for the preservation of the reactants, the device and the method according to the invention can represent a system, or a portion of a system, for biological analyses, which is particularly adapted for utilization in the developing countries. They are in fact simple to construct and to apply in rudimentary conditions.

We claim:

1. Device, useful for the analysis and measurement of constituents of solid or liquid media, comprising a hermetically closed container, said container constituting a single chamber adapted to contain chemical or biological reactants necessary for the analysis, in liquid, lyophilized or solid form, said chamber providing a hollow space formed in material perforatable on all surfaces thereof, said material being inert with respect to the participants in the reaction, and adapted to receive through said perforatable material means respectively (1) for the introduction of diluents and/or test samples of the medium to be measured and (2) for the measurement of the reaction enabling the measurements in situ, and said container further including an irremovable cover on said chamber, rigid and optically flat on at least its inner surface and optically transparent over at least its central portion.

2. Device according to claim 1, wherein said chamber is constituted by a hollow space of cylindrical or substantially parallelepipedic shape, closed by said irremovable rigid cover.

3. Device according to claim 1, wherein the cover is constituted of a rigid transparent plate, the matter of which is selected from the group consisting of polyethylene, polystyrene, PVC, polyester, polycarbonate, a polyacrylic resin such as polymethylmethacrylate, polyethylene glycol terephtalate or melamine-formol aminoplast, or any possible mixture thereof.

4. Device according to claim 1, wherein the cover consists of a material which is transparent or at least translucent with respect to the visible light and the near ultraviolet up to at least about 340 nm.

5. Device according to claim 1, wherein the cover is provided with a protective member, removable or designed to remain in place, applied and fastened on the outer surface of said cover.

6. Device according to claim 1, wherein said container is one of a series or strip of identical devices, the manufacture of which comprises the operations of forming, filling thereof and fastening of the covers.

7. Device according to claim 1, including, on the periphery of the cover, cuts or notches, designed to transmit data to a suitable sensor.

8. Device according to claim 1, wherein the outer walls other than the cover of the container include data readable by man or by electronic or mechanical means.

9. Device according to claim 8, wherein said data consists of inscriptions borne in alpha-numeric form or coded in the form of bars or machine reading and decoding.

10. Device according to claim 1, wherein said chamber contains reactants which are liquid, or lyophilized, or solid reactants and notably in crystal, inert powder, mixtures of powders and crystals, or tablet form.

11. Method for carrying out analysis and measurements of constituents of solid or liquid media, in a device comprising a hermetically closed container, said container constituting a single chamber adapted to contain chemical or biological reactants necessary for said analysis, in liquid, lyophilized or solid form, said chamber providing a hollow space formed in material perforatable on all surfaces thereof, said material being inert with respect to participants in the reaction, said container further including an irremovable cover on said chamber, rigid and optically flat on at least its inner surface and optically transparent over at least its central portion, said method comprising the introduction, by piercing one of said perforatable surfaces, of means respectively (1) for the introduction of diluants and/or test samples of the medium to be measured and (2) for the measurement, as well as if necessary the optimization of the reaction enabling the measurements in situ.

12. Method according to claim 11, wherein the said device is inverted to position it on said cover.

13. Method according to claim 11, comprising introducing after, or simultaneously with, piercing of the perforatable walls of said container, at least one suitable sensor which is immersed in the liquid medium.

14. Method according to claim 11, comprising introducing to carry out the analysis, a solid medium, in powdered or granular form, and diluting the latter, notably by means of suitable diluents.

15. Method according to claim 14, wherein the dilution is carried out by means of the reactant itself, the latter being in liquid form.

16. Method according to claim 11, wherein anyone of the perforatable walls of the chamber, preferably the bottom, is pierced by devices suitably selected and assuring the passage and the introduction into the container of:

- means for the introduction of possible diluents and/or test samples of the products to be measured,
- sensors necessary for the determination of the temperature, of the pH or of the reaction generated,
- means combining the introduction of reactants or complements of reactions in suitable form and specific sensors, or
- generally any means necessary for the occurrence and the measurement of the reaction in situ.

17. Method according to claim 11, wherein the measurement is effected by photometry.

18. Method according to claim 17, wherein the container is inverted, it is positioned above a suitable light source, the bottom of this inverted and positioned container is pierced, there is introduced and dipped until it is immersed in the liquid of which the absorption has to be measured, an optical fiber whose useful end includes an optically flat tablet, notably constituted by a sapphire by a synthetic ruby.

19. Method according to claim 18, wherein the end of this optical fiber is strictly positioned, so as to arrange a predetermined strictly fixed thickness of liquid, between the inner surface of the optically transparent cover and the operative end of the optical fiber, immersed in the liquid medium.

20. Method according to claim 17, wherein the optical fiber is connected to a photomultiplier device, in front of which is inserted a wave length selection system.

21. Method according to claim 17, wherein there is also introduced into the container other physico-chemical sensors, thus enabling the measurement or evaluation of a physico-chemical parameter necessary for the successful execution of the principal measurement.

22. Method according to claim 17, comprising applying, instead and in place of the ordinary light source, a laser generator and an appended apparatus enabling notably the measurement of the turbidity of a medium wherein a reaction of the antigen-antibody type is generated.

23. Method according to claim 11, comprising the application of physico-chemical sensors selected from among thermometric probes, ion electrodes, gas electrodes, and electrodes combined with enzymes insolubilized on a membrane.

24. Device, useful for the analysis and measurement of constituents of solid or liquid media, comprising a hermetically closed container, said container constituting a single chamber adapted to contain chemical or biological reactants necessary for the analysis, in liquid, lyophilized or solid form, said chamber providing a hollow space formed of a semi-rigid plastics material perforatable on all surfaces thereof, said material being inert with respect to the participants in the reaction, and adapted to receive through said perforatable material means respectively (1) for the introduction of diluents and/or test samples of the medium to be measured and (2) for the measurement of the reaction enabling the measurements in situ, and said container further including an irremovable cover on said chamber, rigid and optically flat on at least its inner surface and optically transparent over at least its central portion.

25. Device according to claim 24, wherein said semi-rigid plastics material is composed of ABS, cellulose acetate, propylene and crystalline ethylene copolymer, PVC copolymer, ethylene ionomers, low density polyethylene, or thermo-formable or expanded polystyrene.

* * * * *